United States Patent

Mattes et al.

[11] Patent Number: 5,876,767
[45] Date of Patent: *Mar. 2, 1999

[54] APPARATUS FOR LAYERWISE PRODUCING AN OBJECT USING LASER SINTERING

[75] Inventors: Thomas Mattes, Hechendorf; Christian Wilkening, Diessen/Ammersee, both of Germany

[73] Assignee: EOS GmbH Electro Optical Systems, Planegg, Germany

[*] Notice: This patent issued on a continued prosecution application filed under 37 CFR 1.53(d), and is subject to the twenty year patent term provisions of 35 U.S.C. 154(a)(2).

[21] Appl. No.: 809,902
[22] PCT Filed: Aug. 1, 1996
[86] PCT No.: PCT/EP96/03382
§ 371 Date: Mar. 19, 1997
§ 102(e) Date: Mar. 19, 1997
[87] PCT Pub. No.: WO97/06918
PCT Pub. Date: Feb. 27, 1997

[30] Foreign Application Priority Data

Aug. 16, 1995 [DE] Germany ................. 295 13 026 U

[51] Int. Cl.⁶ .......................... B23K 26/14; B29C 35/08
[52] U.S. Cl. ..................... 425/174.4; 264/482; 264/497
[58] Field of Search .................. 425/174.4; 264/497, 264/482; 219/121.6, 121.73, 121.74, 121.75; 156/272.8, 380.9

[56] References Cited

U.S. PATENT DOCUMENTS 3,597,578  8/1971  Basil et al. ........................ 219/121 L
5,460,758  10/1995 Langer et al. ....................... 264/497
5,500,069  3/1996  Ogue et al. ........................ 425/174.4
5,639,070  6/1997  Deckard ............................ 264/497
5,658,412  8/1997  Retallick et al. .................. 425/174.4
5,665,401  9/1997  Serbin et al. ..................... 425/174.4

FOREIGN PATENT DOCUMENTS 1564933   4/1969   France .
57-91893  6/1982   Japan .
3-151186  6/1991   Japan .
4-157076  5/1992   Japan .
4-305391  10/1992  Japan .
5-77081   3/1993   Japan .
WO 87/07862 12/1987 WIPO .
WO 88/02677 4/1988  WIPO .

*Primary Examiner*—Robert Davis
*Attorney, Agent, or Firm*—George W. Neuner

[57] ABSTRACT

An apparatus for layerwise production of an object using laser sintering by solidifying a material which is solidifiable by electromagnetic radiation comprises a device (5) for producing an electromagnetic beam (6) and a focusing device (8) for focusing the beam (6) onto the material within a working plane (7), whereby the focusing device (8) comprises a lens (9) and a mount (10) holding the lens (9), a ring nozzle (12) arranged adjacent to the image-side surface (11) of the lens (9) facing the working plane (7), the ring nozzle having its outlet oriented relative to the image-side surface (11) so that a discharged stream strokes tangentially along the image-side surface (11) towards the center, the inlet of the ring nozzle being selectively connected with a source of pressurized gas.

3 Claims, 1 Drawing Sheet

APPARATUS FOR LAYERWISE PRODUCING AN OBJECT USING LASER SINTERING

The present invention relates to an apparatus for layerwise producing an object using laser sintering.

The applicant is aware of an apparatus for layerwise producing an object using laser sintering, the apparatus comprising a support for positioning the object in relation to a working plane and a device for applying a powder which can be solidified by electromagnetic radiation. The apparatus further comprises a laser. The laser beam produced by the laser is focused onto a point within the working plane by means of a focusing device comprising a lens and solidifies the powder. Especially in case that polyamide is used as the powder material, monomers escape from the powder and precipitate on the lens, whereby the transparency thereof is progressively reduced in the course of the building process. This causes a progressive absorption of the laser beam, whereby its intensity at the working plane decreases. Owing to the decreasing intensity the quality of the object to be formed is reduced. In order to overcome this problem a protecting glass is arranged in front of the lens and nitrogen is blown out of a plurality of nozzles onto the protecting glass. However, since the nitrogen flows over part of the protecting glass only and no flow exists between the nozzles, the monomers precipitate at these places. Thus, the protecting glass must be removed and cleaned after each building process of an object.

It is the object of the invention to provide an apparatus for layerwise producing an object by laser sintering wherein the focusing unit is effectively protected against contamination.

This object is achieved by the apparatus comprising a device for producing an electromagnetic beam and a focusing device for focusing the beam onto the material within a working plane, whereby the focusing device comprises a lens and a mount supporting the lens, a ring nozzle arranged adjacent to the image-side surface of the lens facing the working plane, the ring nozzle having an outlet directed in relation to the image-side surface so that an outflowing stream strokes tangentially along the image-side surface towards the center, the inlet of the nozzle being selectively connected to a source of pressurized gas.

The apparatus is advantageous in that the nitrogen blown through the ring nozzle flows over the entire lens surface facing the working plane. Since the nitrogen is blown in a tangential direction of the lens surface, the flow produced is directed from the outer side of the lens towards the center thereof and therefrom towards the working plane. This flow efficiently prevents the precipitation of monomers on the lens surface. Hence, cleaning of the lens is required at considerably longer intervals.

Further features and advantages of the invention will be apparent from the description of embodiment with reference to the Figures. In the FIGS.

Figure 1:
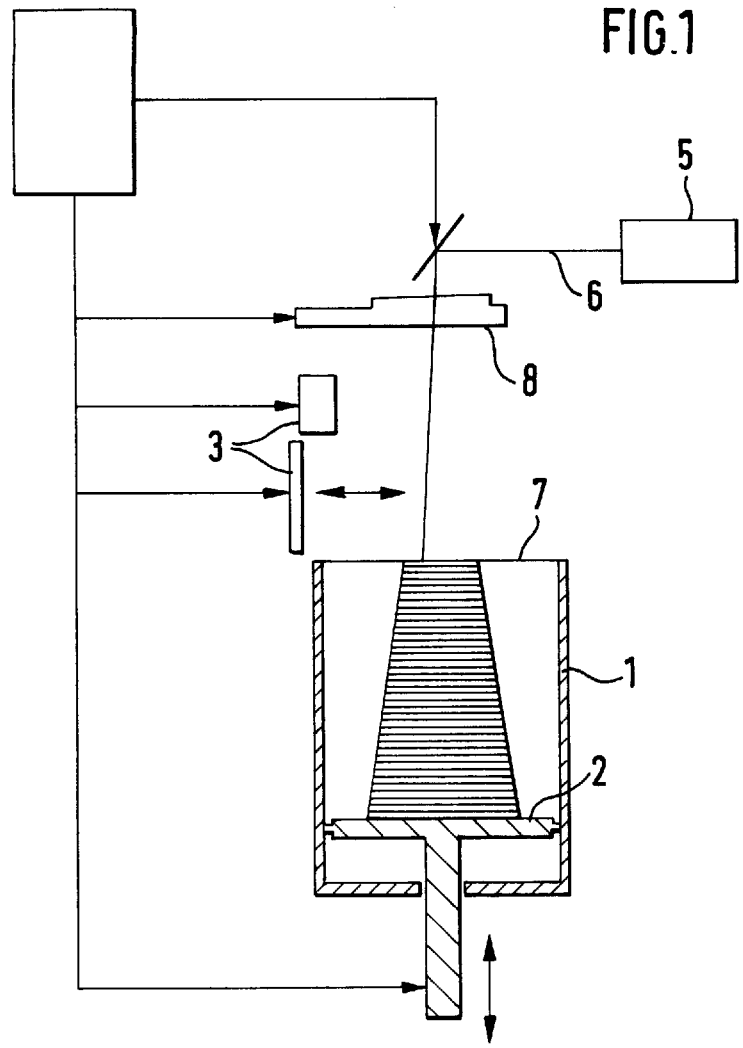
FIG. 1 is a schematic block diagram of the apparatus.

As shown in FIG. 1 the apparatus for layerwise production of an object comprises a support 2 which supports the object to be formed and which is movable in vertical direction within a tank 1 having an open top. The support 2 is vertically adjusted so that the respective layer of the object to be solidified is in a working plane 7. Moreover, a coating device 3 is provided for applying the powderous building material which can be solidified by electromagnetic radiation. The apparatus comprises a laser 5. The laser beam 6 produced by the laser 5 is focused onto a predetermined point within the working plane 7 by means of a focusing device 8.

Figure 2:
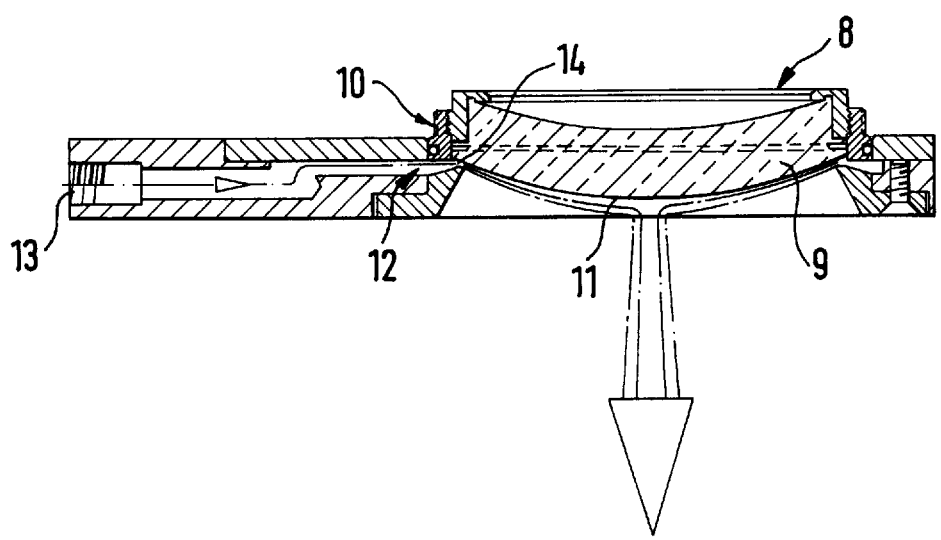
FIG. 2 shows a section through the ring nozzle.

As shown in FIG. 2, the focusing device 8 comprises a lens 9 and a mount 10 supporting the lens 9. The lens 9 comprises an image-side surface 11 facing the working plane 7. A ring nozzle 12 having an inlet connection 13 is provided in the mount 10. A reservoir containing a pressurized gas is coupled to the inlet connection 13 through a valve. Preferably, nitrogen is used for the gas. The ring nozzle 12 is arranged in the mount 10 adjacent to the image-side surface 11. The nozzle outlet orifice 14 is directed towards the image-side surface 11 so that the discharged gas stream flows tangentially across the image-side surface.

In operation the valve is opened and nitrogen flows through the inlet connection 13 into the ring nozzle 12 and out through the nozzle outlet orifice 14. The outflowing gas strokes across the entire image-side surface 11 of the lens 9 in a direction tangentially thereto. The gas flows radially towards the center of the lens 9 and therefrom in direction towards the working plane 7 so that monomers produced when solidifying the powder can not precipitate on the lens 9.

We claim:

1. Apparatus for the layerwise production of an object by laser sintering a material which can be solidified using electromagnetic radiation, the apparatus comprising:

means for producing a layer of said material extending along a working plane, means for generating a beam of electromagnetic radiation, focusing means for focusing said beam onto said layer of said material, said focusing means comprising:
a lens system having an image-side surface facing said working plane,
mounting means holding said lens system,
a ring nozzle arranged adjacent to said image-side surface of said lens system, said ring nozzle having an inlet and a nozzle outlet orifice,
a source of a pressurized gas; and
means for selectively connecting said nozzle inlet to said source of pressurized gas,
said nozzle outlet orifice being oriented relative to said image-side surface for directing a flow of said pressurized gas tangentially across the entire image-side surface from its periphery radially towards its center.

2. The apparatus of claim 1, wherein said pressurized gas source is nitrogen source.

3. The apparatus of claim 1, said focusing means further comprising a passage between said inlet and said ring nozzle, said passage having a reduction in size causing a bend in the direction of flow of pressurized gas.

* * * * *